United States Patent Office 3,504,709
Patented Apr. 7, 1970

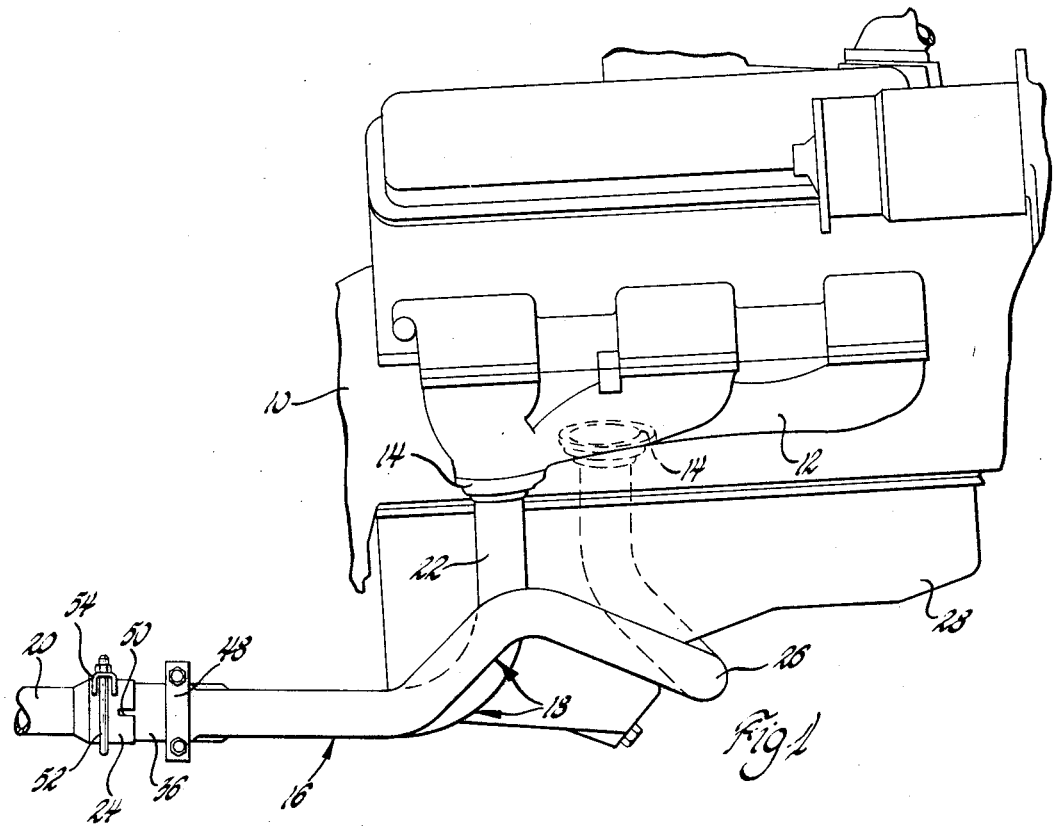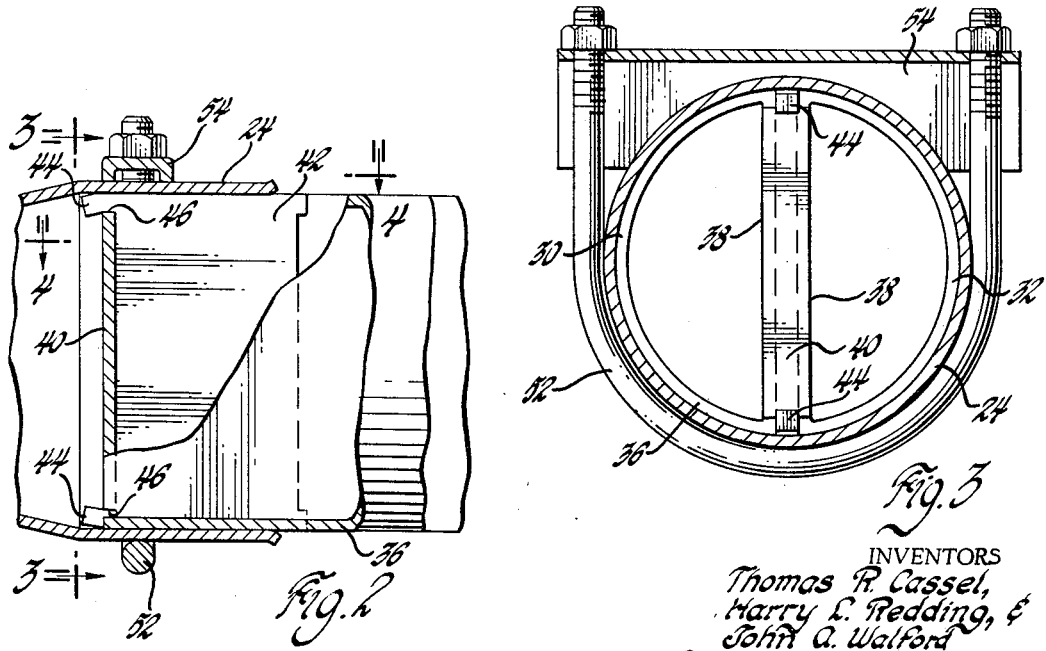

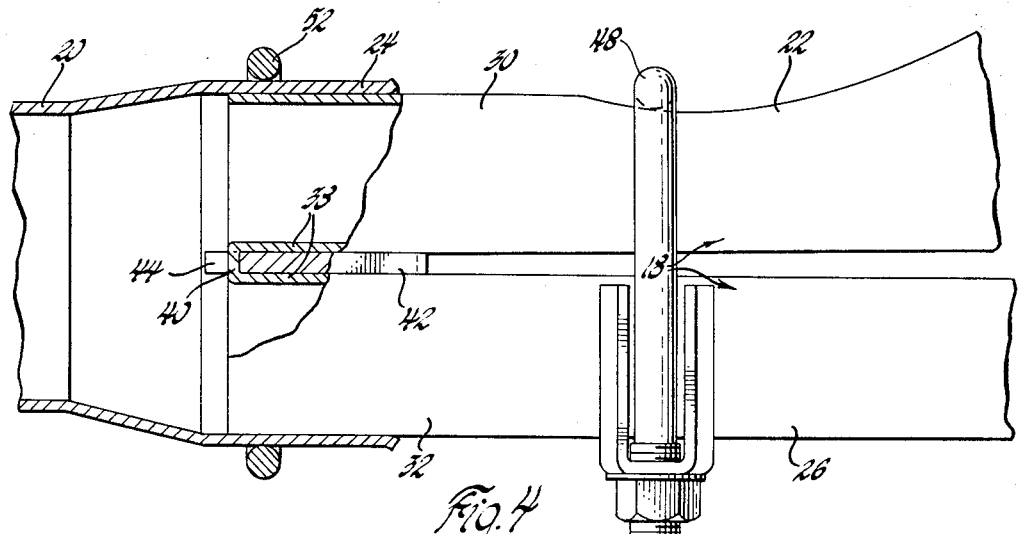
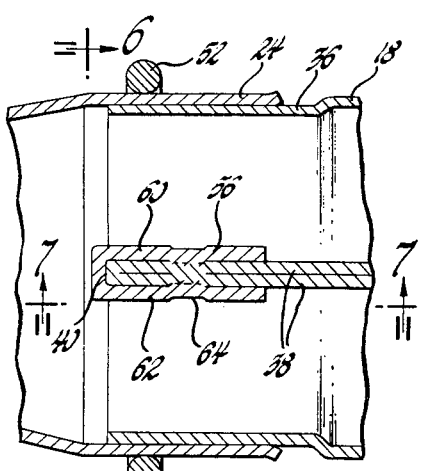
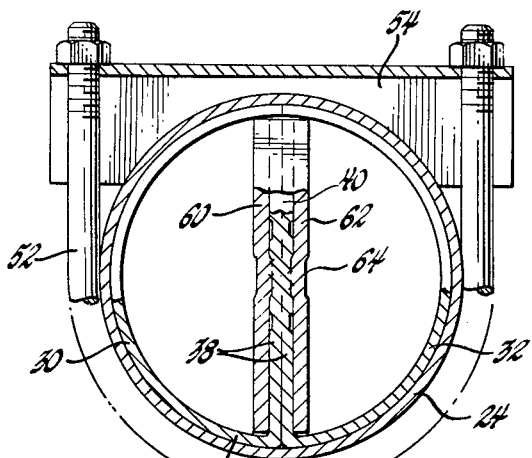
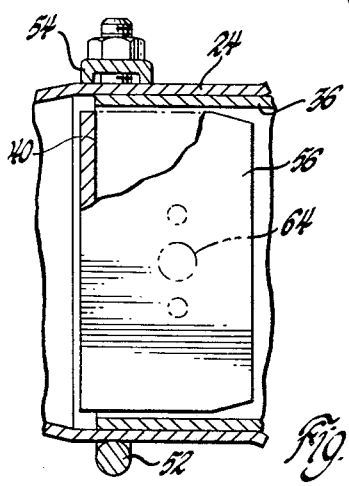
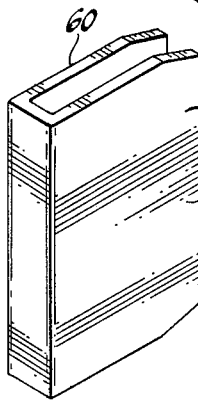

3,504,709
BRANCHED CONDUIT
Thomas R. Cassel, Birmingham, Harry L. Redding, Pontiac, and John A. Walford, Rochester, Mich., assignors to General Motors Corporation, Detroit, Mich., a corporation of Delaware
Filed Oct. 7, 1965, Ser. No. 493,781
Int. Cl. F16l 9/18
U.S. Cl. 138—116                           2 Claims

ABSTRACT OF THE DISCLOSURE

A branched conduit formed from a single length of pipe wherein intermediate portions of the pipe are formed to a generally D-shape and transversely cut intermediate of the formed portion to the substantially flat side wall. The pipe is then reversely bent upon itself so that the end portions of the semi-circular walls form a substantially annular transverse outlet and the flat walls are in juxtaposed relationship and commonly joined by a continuously reversely bent juncture wall. Reinforcing means are provided between the flat wall and, in combination with the juncture wall, provide columnar strength for the branched conduit under compressive loading of the end portions.

---

The branched conduit of this invention has many uses and is particularly useful for connecting engine exhaust manifolds to a main exhaust conduit. In the preferred embodiment of the invention, the conduit includes a pair of branches fabricated from a single length of pipe, each of which has one end thereof secured to an exhaust manifold. The other ends of the branches are of generally D-shape and are commonly connected at the flat walls by a continuous reversely bent juncture wall to provide a generally annular end portion received within a complementary shaped annular end portion of the main exhaust conduit to connect the exhaust manifolds to the main conduit.

The branched conduit is fabricated from a continuous length of pipe by first forming an intermediate portion of the pipe into generally D-shape, cutting through the curved wall of the portion to the flat wall thereof, and then reversely bending the pipe back upon itself across the flat wall to form the branches and locate the integrally joined D-shaped end portions of the branches in back-to-back relationship to provide the annular end portion for the branched conduit which is secured to the main exhaust conduit. The annular end portion may be reinforced against buckling under compressive loads by either clamping a plate between the back-to-back walls of the end portions or by securing a U-shaped clip member to the continuous reversely bent juncture wall of the back-to-back walls.

One feature of this invention is that it provides a branched conduit having integral branches.

Another feature of this invention is that the branches are fabricated from a continuous length of pipe.

A further feature of this invention is that the branches have free end portions adapted to be secured to an exhaust manifold and integrally joined generally D-shaped end portions located in back-to-back relationship.

Yet another feature of this invention is that the integrally joined end portions of the branches are reinforced.

Yet a further feature of this invention is that it provides a method of fabricating a branched conduit having a plurality of integrally joined branches.

These and other features of the invention will become apparent from the following detailed description of the invention and the accompanying drawings wherein:

FIGURE 1 is a side elevational view of a portion of an internal combustion engine embodying a branched conduit according to this invention;

FIGURE 2 is an enlarged partially broken away view of a portion of FIGURE 1;

FIGURE 3 is a view taken generally along the plane indicated by line 3—3 of FIGURE 2;

FIGURE 4 is a partially broken away view taken generally along the plane indicated by line 4—4 of FIGURE 2;

FIGURE 5 is a view similar to FIGURE 4 and showing a modification of the invention;

FIGURE 6 is a partially broken away view taken generally along the plane indicated by line 6—6 of FIGURE 5;

FIGURE 7 is a partially broken away view taken generally along the plane indicated by line 7—7 of FIGURE 5; and FIGURE 8 is a perspective view of the reinforcement clip.

Referring to the drawings, a conventional internal combustion engine 10 is provided with exhaust manifolds 12 on opposite sides thereof to receive the discharged products of combustion from the engine cylinders. The manifolds 12 have manifold outlets 14 which are connected to an exhaust conduit system 16 having a branched conduit 18 according to this invention and a main conduit 20.

Branch 22 of conduit 18 extends downwardly from its respective manifold outlet 14 and then curves rearwardly and extends behind the engine to the forward end 24 of the main conduit 20. A second branch 26 of conduit 18 extends downwardly from its respective manifold outlet 14, passes beneath the engine oil pan 28, and then curves rearwardly extending behind the engine to the forward end 24 of the main conduit 20.

The outlet portions 30 and 32 of branches 22 and 26 are of generally D-shape and arranged in back-to-back relationship to provide a generally annular outlet end portion 36, which is telescopically received within the forward end of the main conduit 20. The wall portions 38 of the branches are interconnected by a continuous reversely bent juncture wall or portion 40. The juncture wall or portion 40 adds columnar strength to the walls 38 to prevent buckling of the walls when the outlet portions 30 and 32 are compressively loaded. However, it may be necessary in certain installations to insert a reinforcement plate or member 42 between the walls as shown in FIGURES 2 and 4. Plate 42 is generally of rectangular shape and has tabs 44 extending from one edge thereof. The tabs extend through slots 46 in the wall 40 and are bent over at a minimum angle of 10 degrees to secure the plate to the conduit 18. The plate 42 may be of varying thickness and serves as a spacer for setting the outer diameter of the conduit end portion 36.

If desired, a saddle and U-bolt assembly 48 may be secured about the branched conduit 18 as shown in FIGURE 4 to aid in retaining the branches 22 and 26 in proper alignment.

The conduit end portion 36 is telescopically received within the complementary shaped, outwardly flared forward end portion 24 of the main conduit 20. The portion 24 may be provided with a plurality of slots 50 to allow ease of assembly. A U-bolt 52 extends around the end portion 24 and is bolted to a saddle member 54 to secure the branched conduit 18 to the main conduit 20 and to also clamp the branched conduit end portion 36 to the main conduit end portion 24 to provide a seal therebetween.

The branched conduit 18 is fabricated from a continuous length of pipe. Initially, an intermediate portion of the pipe is swaged or otherwise formed into generally D-shape. A cut is then made transversely through the curved part of the portion to the flat wall thereof. The pipe is then reversely bent upon itself to form the branches 22 and 26 and the juncture wall 40.

A suitable tool may then be inserted into each of the portions 30 and 32 of the branches to move the wall portions 38 thereof into engagement with each other. Alternatively, if the plate 42 is to be provided, the juncture wall 40 is notched at each end thereof, the plate 42 inserted between the wall portions 38 with the tabs 44 thereof extending through the notches in the wall 40, and then the wall portions 38 clamped against the plate 42 by means of a suitable tool. The tabs 44 of the plate may be bent over the juncture wall either before or after the wall portions 38 are clamped against the plate. It can thus be seen that the entire branched conduit is formed without the need for any welding. This is an important feature of this invention since it is difficult to insert a welding tool into the D-shaped end portions of the conduit to weld the wall portions 38 to the plate. By controlling the thickness of the plate 42, the outer diameter of the end portion 36 of the conduit can also be controlled within close tolerance limits.

In the modification of the invention shown in FIGURES 5 through 7, the wall portions 38 are reinforced by a generally U-shaped clip 56 inserted over the end portion 40 and engaging wall portions 38 to prevent their buckling when compressively loaded. Leg portions 60 and 62 of the clip extend inwardly and substantially cover the diametrical width of the wall portions. The clip and wall portions are spotwelded at 64 to secure these members to each other.

In this modification, the outer diameter of the end portion 36 of the conduit cannot be controlled within close tolerance limits by means of the reinforcement member as in the first embodiment since the wall portions 38 engage each other rather than being spaced from each other. The conduit 18 is fabricated and secured to the main exhaust conduit 20 in the same manner as previously described.

Thus, this invention provides an improved branched conduit.

We claim:

1. A branched conduit formed from a single length of pipe, comprising; a pair of branch conduits having generally D-shaped axially parallel end portions including outwardly facing semi-circular outer walls and inwardly facing transversely spaced juxtaposed flat walls joined by a continuous reversely bent juncture wall; and a generally rectangular reinforcement plate extending transversely between said flat walls and secured at one end to the juncture wall; said outer walls providing a substantially annular transverse outlet portion and said juncture wall and reinforcement plate providing columnar strength for said flat walls under compressive loading of said end portions.

2. The branched conduit recited in claim 1 wherein said reinforcement plate includes spaced tabs that are formed over said juncture wall to mechanically lock said reinforcement plate to said juncture wall.

References Cited

UNITED STATES PATENTS 3,336,056   8/1967   Cassel et al. _____ 285—328 XR

HERBERT F. ROSS, Primary Examiner

U.S. Cl. X.R.

285—137, 150